Patented Sept. 25, 1923.

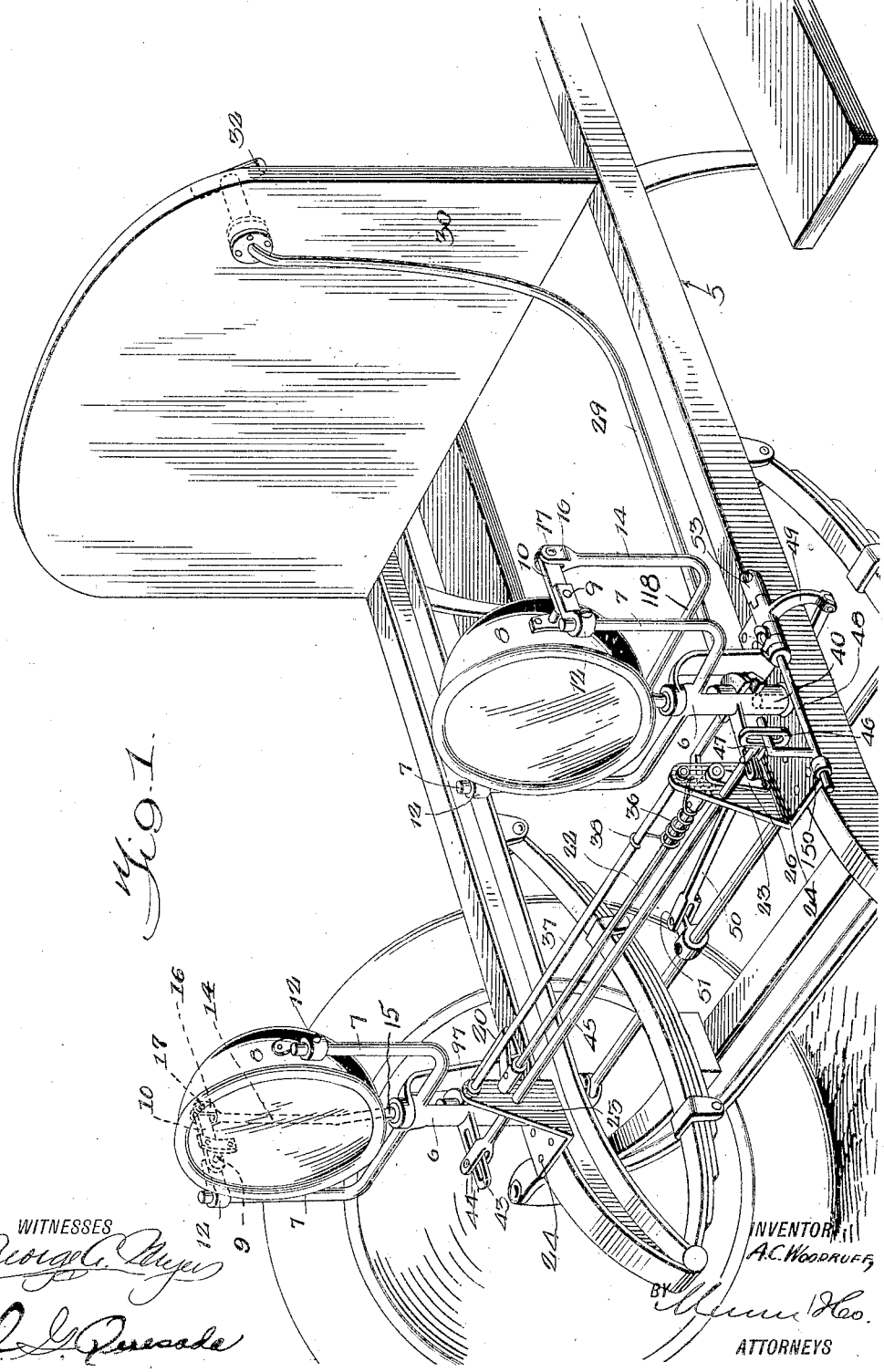

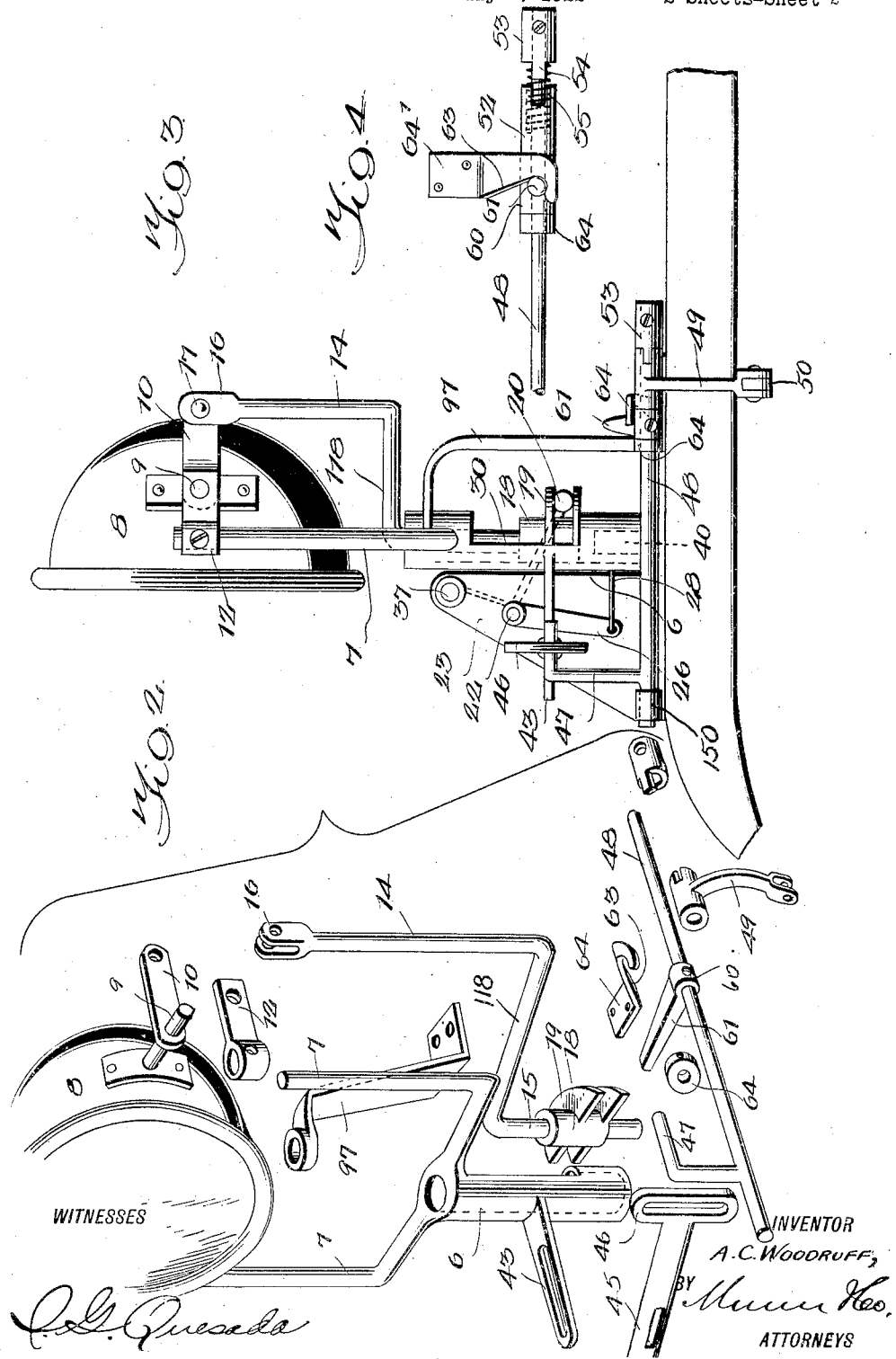

1,469,203

UNITED STATES PATENT OFFICE.

ALVIE C. WOODRUFF, OF PORTLAND, OREGON.

DIRIGIBLE HEADLIGHT.

Application filed July 1, 1922. Serial No. 572,142.

*To all whom it may concern:*

Be it known that I, ALVIE C. WOODRUFF, a citizen of the United States, and resident of Portland, in the county of Multnomah and State of Oregon, have invented certain new and useful Improvements in Dirigible Headlights, of which the following is a specification.

This invention relates to dirigible headlights especially adapted for application to motor vehicles and the like.

An important object is to provide a dirigible headlight having novel means whereby the lamps are simultaneously turned either to the right or left as the vehicle changes its direction of travel.

Also the invention forming the subject matter of this application aims to provide a dirigible headlight having novel means whereby the lamps may be tilted about a horizontal axis so that the rays from the lamps will be directed downwardly immediately in front of the automobile or cast some distance in front of the automobile.

A further object is to provide a dirigible light for motor vehicles which is of highly simplified construction, durable in use and cheap to manufacture.

Other objects and advantages of the invention will be apparent during the course of the following description.

In the accompanying drawing, forming a part of this application and in which like numerals are employed to designate like parts throughout the same, Figure 1 is a perspective of the improved dirigible light applied.

Figure 2 is a group perspective of one of the lamps and operating means therefor.

Figure 3 is a detail side elevation illustrating one of the lamps and the operating means therefor.

Figure 4 is a detail side elevation illustrating a clutch embodied in the invention, the improved clutch forming a means for breaking the connection between the lamps and the steering mechanism in the day time.

In the drawing, wherein for the purpose of illustration is shown a preferred embodiment of the invention, the numeral 5 generally designates a vehicle having a pair of tubular standards 6 having their upper portions formed with spaced parallel arms 7 arranged on opposite sides of lamps or headlights 8. As illustrated in Figures 1 and 2 the opposite sides of each lamp are provided with trunnions 9 having rearwardly directed cranks 10, the said cranks being rigid with the trunnions. The end portions of the trunnions 9 extend beyond the cranks 10 and are rotatably connected to the terminal portions of brackets 12 secured on the upper portion of the arms 7. It will be seen that the brackets 12 which are rigidly secured to the arms 7 rotatably support the lamps 8 so that the same may move about a horizontal axis for moving the light rays to a desired position.

In carrying out the invention the cranks 10 of which there are two are operated by vertically movable arms 14 having lower bearing portions 15 which are slidable through the tubular standard 6 as illustrated particularly in Figures 1 and 3. The upper portions of the arms 14 are formed with spaced ears 16 pivoted on opposite sides of the cranks 10 as indicated at 17. Figure 3 illustrates that when the arms 14 are elevated the cranks 10 will move about a horizontal axis and consequently the lamps 8 will be also turned about a horizontal axis.

As illustrated in Figures 2 and 3 the intermediate portions of the rods 14 are offset as indicated at 118 so that the lower bearing portions 15 may pass through the tubular standards 6. The lower portion of each rod 14 or more particularly the bearing portion 15 is provided with a collar 18 having upper and lower flanges 19 which constitute what might be said to be a recess or pocket for the reception of L-shaped cranks 20.

The cranks 20 which are of L-shaped formation are rigidly secured to a transversely extending shaft 22 rotatably carried by upstanding brackets 23 of base plates 24. With reference to Figures 1 and 3 it will be seen that one end of the shaft 22 is provided with a downwardly extending crank 26 having its lower portion connected to an operating wire or rod 28. The wire 28 passes through a cable 29 and terminates rearwardly of the vehicle dash 30. The rear terminal portion of the rod 28 may be provided with a suitable handle 32 by means of which the flexible element 28 may be drawn rearwardly when desired.

When the flexible element 28 is drawn rearwardly, the shaft 22 is rocked, thereby moving the L-shaped cranks 20 upwardly. That is to say those branches of the L-shaped cranks 20 which are connected to the flanges 19 are moved upwardly so as to also move the rods 14 upwardly.

When the rods or links 14 are elevated the lamps are turned about a horizontal axis. The rear side of each tubular standard 6 is cut away and is open as indicated at 30 so as to allow the collars 18 to move freely when operated by the L-shaped cranks 20. However, the ends of the openings 30 limit the endwise movement of the collars 18 and consequently limit the turning movement of the lamps.

When the handle 32 and the cable 28 is released, the lamps are returned to their original positions by means of a spring 36 trained about the shaft 22 and having one terminal portion anchored to a bracing rod 37 as indicated at 38. The other end portion of the coiled spring 36 is engaged with the adjacent crank 20 and urges the same downwardly, whereby the lamps are at all times urged to their original positions.

In carrying out the invention the tubular standards 6 are mounted upon cylindrical supporting members 40 carried by the base plates 24. The members 40 are in the nature of lugs and extend into the tubular standards for rotatably supporting the same. However, as illustrated in Figure 3 the lugs 40 terminate beneath the lower ends of the rods 14.

The means for turning the lamps about a vertical axis includes forwardly directed arms or cranks 43 having longitudinal slots to receive pivot pins 44 carried by the end portions of a longitudinally movable rod 45. The rod 45 is movable transversely of the vehicle and is passed through the upstanding brackets 23 and one end of the rod 45 is provided with a head having a vertical slot 46 for the reception of a crank 47 carried by a longitudinally extending shaft 48. The longitudinally extending shaft or rod 48 is rotatably carried by bearings 150 and has connection with a crank 49 which in turn is connected to an attaching bar 50 joined as indicated at 51 with the steering mechanism of the vehicle.

The driving connection between the crank 49 and the longitudinally extending shaft 48 is not constant as during the day it is not necessary to turn the lamps when the vehicle changes its direction of travel. Therefore, I have provided a clutch consisting of sections 52 and 53, the section 53 being rigidly secured to the shaft and having tongues or driving fingers 54 adapted to be received in notches 55 in the section 52. The section 52 is formed at the upper end of the crank 49 and is rotatably mounted upon the shaft 48. It will be seen that when the shaft 48 is moved longitudinally the fingers 54 will be received within the notches 55 so as to provide a driving connection between the sections 52 and 53 and consequently a driving connection between the crank 49 and the longitudinally extending shaft.

The shaft 48 may be moved longitudinally by the rotation of a sleeve 60 having a radial projection 61 in contact with the inclined face or edge 63 of a stationary bracket 64'. The sleeve 60 is rotatable on the shaft 48 and contacts with one side of a stationary shoulder or sleeve 64 on the shaft. That is to say the member 64 is rigidly secured to the shaft 48 and when the radial projection is moved toward the attaching portion of the stationary bracket 64' the shaft will move longitudinally so as to establish a driving connection between the sections 52 and 53. When the radial projection is moved into the position illustrated in Figure 1 or when it is moved inwardly, the turning of the wheels will result in the turning of the headlights. When it is desired to break the connection between the steering and the front wheels, it is merely necessary to move the radial projection 61 outwardly to the full line position illustrated in Figure 4 whereupon the operation of the steering wheel has no effect whatever upon the lamps.

With reference to the foregoing description taken in connection with the accompanying drawings, it will be apparent that a dirigible headlight constructed in accordance with this invention will be turned to correspond to the direction of travel of the vehicle so as to effectively illuminate the roadway.

It will also be seen that the driving connection between the lamps and the steering mechanism may be readily and conveniently broken so that the lamps will not be turned in the day time.

Having thus described the invention, what I claim is:—

1. The combination of a pair of tubular standards having spaced arms, brackets connected to said arms, lamps arranged between said arms and having laterally projecting trunnions rotatably connected to said brackets, said trunnions being provided with cranks, vertically movable rods connected to said cranks and having their intermediate portions offset and their lower portions slidable through said tubular standards, base plates having upstanding lugs received in said tubular standards for rotatably supporting the standards, collars mounted on said rods and having recesses, and an operating shaft having cranks received in said recesses and forming a means for elevating the same.

2. The combination of a pair of base plates having upstanding brackets and upstanding lugs, standards rotatably mounted on said lugs and having upwardly directed arms, brackets connected to the upper portions of said arms, headlights having trunnions rotatably connected to said second named brackets, vertically movable rods having connection with said trunnions for rotating the same, the lower portions of said rods being slidable through said standards, collars mounted on said rods and having pairs of flanges constituting recesses, a shaft rotatably supported by said brackets and having cranks provided with branches received in said recesses, said standards being provided with recesses receiving said collars, the ends of said second named recesses constituting stop elements to limit the vertical movement of the rods, and means connected to said operating shaft for rocking the same and consequently turning said headlights about a horizontal axis.

3. The combination of a pair of spaced plates having upstanding brackets and upstanding lugs, standards rotatably mounted on said lugs and having upwardly directed arms, brackets connected to the upper portions of said arms, headlights having trunnions rotatably connected to said second named brackets, vertically movable rods having connection with said trunnions for rotating the same, the lower portions of said rods being slidable through said standards, collars mounted on said rods and having pairs of flanges constituting recesses, a shaft rotatably supported by said first named brackets and having cranks provided with branches received in said recesses, said standards being provided with recesses receiving said collars, the ends of said second named recesses constituting stop elements to limit the vertical movement of the rods, means connected to said operating shaft for rocking the same and consequently turning said headlights about a horizontal axis, and a spring associated with said shaft and engaging one of said cranks for normally holding the rods in their lowermost positions.

4. The combination with a standard having arms, brackets rigidly secured to the upper portions of said arms, a light projector having trunnions rotatably connected to said brackets, one of said trunnions being provided with a crank, a vertically movable rod connected to said crank for tilting the light projector about a horizontal axis, manually controlled means for moving said rod vertically, said standards being provided with a crank, a control shaft operatively connected to said crank, a pair of clutch sections mounted on said shaft, one of the clutch sections being fixed on the shaft and the other being movable, and an operating member having connection with one of said sections and having means whereby the same may be engaged with the other section, whereby to establish a driving connection between the operating means and the shaft.

ALVIE C. WOODRUFF.